US006812653B2

(12) United States Patent
Bellivean

(10) Patent No.: US 6,812,653 B2
(45) Date of Patent: Nov. 2, 2004

(54) METHOD AND APPARATUS FOR CONTROLLING IMAGES WITH IMAGE PROJECTION LIGHTING DEVICES

(76) Inventor: Richard S. Bellivean, 10643 Floral Park, Austin, TX (US) 78759

(*) Notice: Subject to any disclaimer, the term of this patent is extended or adjusted under 35 U.S.C. 154(b) by 55 days.

(21) Appl. No.: 10/206,162

(22) Filed: Jul. 26, 2002

(65) Prior Publication Data

US 2004/0017164 A1 Jan. 29, 2004

(51) Int. Cl.$^7$ .............................................. H05B 37/00
(52) U.S. Cl. ........................ 315/318; 315/316; 315/294; 315/292; 315/312
(58) Field of Search .......................... 315/312, 316–318, 315/292–294

(56) References Cited

U.S. PATENT DOCUMENTS

| | | | | |
|---|---|---|---|---|
| 3,706,914 A | * | 12/1972 | Van Buren | 315/316 |
| 3,898,643 A | * | 8/1975 | Ettinger | 700/84 |
| 4,095,139 A | * | 6/1978 | Symonds et al. | 315/153 |
| 4,697,227 A | * | 9/1987 | Callahan | 362/233 |
| 5,329,431 A | * | 7/1994 | Taylor et al. | 362/85 |
| 5,402,326 A | * | 3/1995 | Belliveau | 362/284 |
| 5,828,485 A | * | 10/1998 | Hewlett | 359/291 |
| 5,829,868 A | * | 11/1998 | Hutton | 362/276 |
| 5,988,817 A | * | 11/1999 | Mizushima et al. | 353/94 |
| 6,057,958 A | * | 5/2000 | Hunt | 359/291 |
| 6,188,933 B1 | | 2/2001 | Hewlett et al. | |
| 6,249,091 B1 | * | 6/2001 | Belliveau | 315/312 |
| 6,331,756 B1 | * | 12/2001 | Belliveau | 315/316 |
| 6,459,217 B1 | * | 10/2002 | Belliveau | 315/315 |
| 6,570,348 B2 | * | 5/2003 | Belliveau | 315/315 |
| 6,605,907 B2 | * | 8/2003 | Belliveau | 315/294 |
| 6,664,745 B2 | * | 12/2003 | Belliveau | 315/315 |

FOREIGN PATENT DOCUMENTS

WO    WO 02/21832 A2 * 3/2002

OTHER PUBLICATIONS

U.S. patent application Ser. No. 10/090,926, Belliveau, filed Mar. 4, 2002.
High End Systems, "Catalyst Media in Motion," 2 pgs, 2002.
Motion Dive motiondive 3, www.motiondiv.com/index.html, 20 pgs., printed Jul. 10, 2002.
High End Systems, The High End Systems Product Line 2000.
High End Systems, Wholehog II Lighting Control Workstation, www.highend.com/products/hog2/hog2feat.html, printed Jul. 26, 2002.
High End Systems, Inc., 2001 Lighting Worldwide Catalog, 2000.
Vusix, "Project charter for the Vusix products and technologies," Drafts Version 2.0.1; Revised Feb. 12, 2001, 33 pages.

* cited by examiner

Primary Examiner—Haissa Philogene
(74) Attorney, Agent, or Firm—Altera Law Group, LLC

(57) ABSTRACT

A lighting system includes a central controller and multiparameter lights, including IPLDs. A display of the multiparameter lights at the central controller includes the IPLDs and their image parameters, which are used to evoke a display of graphics tools at the central controller for originating images. Images originating at the central controller are transmitted to the IPLDs either by or under control of the central controller. The graphics tools may also be able to manipulate images. The central controller is provided with one or more image editors, which include the graphics tools. The outputs of the image editors, which are referred to as "image banks," are routed to multiple multiparameter lights (including IPLDs) in accordance with assignments made by the operator of the central controller. The central controller also uses a collage display screen of a collage generator to allow the operator to select an image to collage.

62 Claims, 12 Drawing Sheets

```
FIXTURE 1  TYPE P1                                    SCENE 1
Pan 220 degrees
Tilt 130 degrees
Color Position 4
Gobo Position 2
Gobo Rotate 20 degrees
Intensity 100 percent FIXTURE 2  TYPE P1
Pan 200 degrees
Tilt 100 degrees
Color Position 3
Gobo Position 1
Gobo Rotate 30 degrees
Intensity 100 percent
```

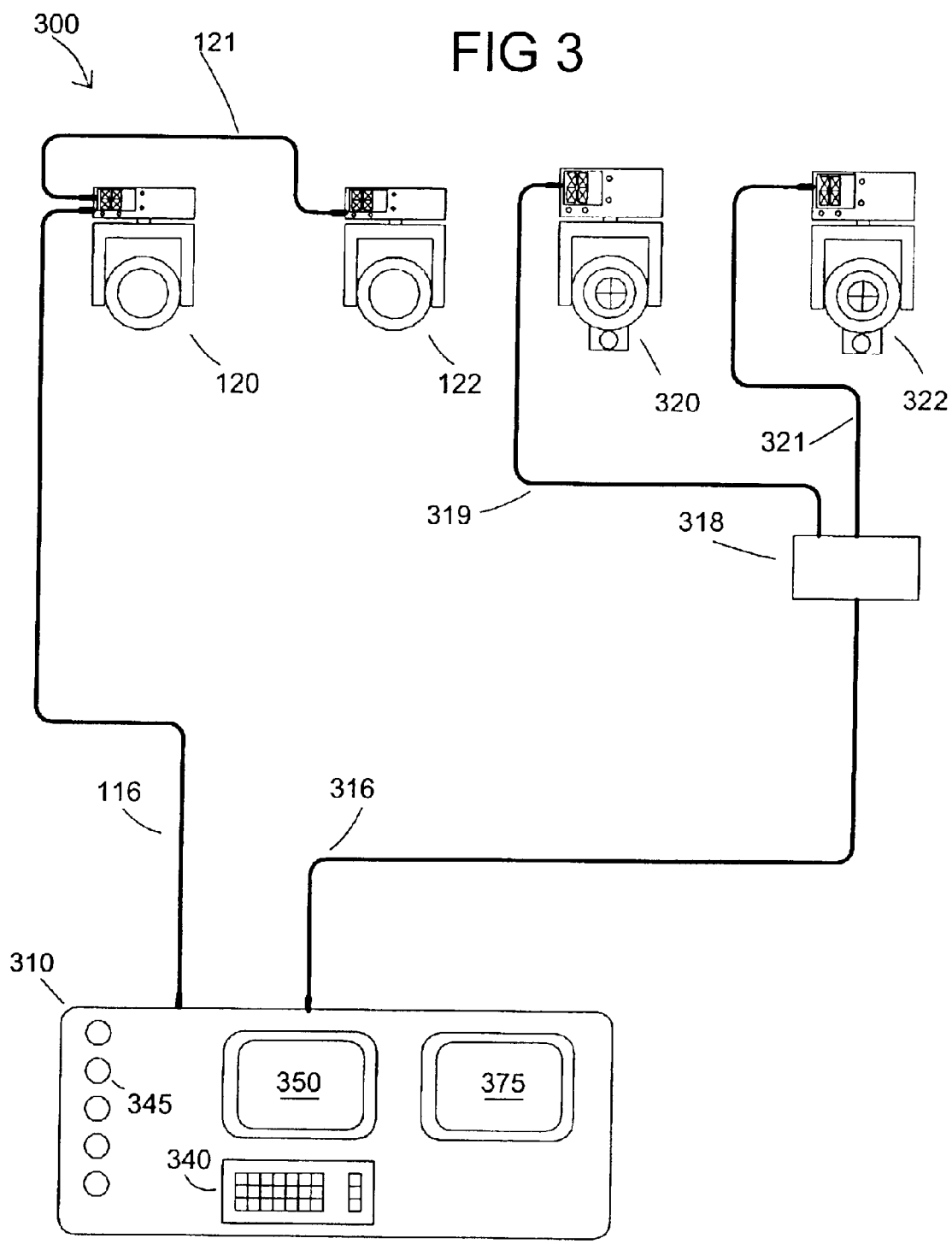

```
FIXTURE 1  TYPE P1                                    SCENE 1
Pan 220 degrees
Tilt 130 degrees
Color Position 4
Gobo Position 2
Gobo Rotate 20 degrees
Intensity 100 percent FIXTURE 2  TYPE P1
Pan 200 degrees
Tilt 100 degrees
Color Position 3
Gobo Position 1
Gobo Rotate 30 degrees
Intensity 100 percent FIXTURE 3  TYPE IPLD 1
Pan 210 degrees
Tilt 120 degrees
Color Position 2
Image Bank 1
Image Rotate 35 degrees
Intensity 100 percent FIXTURE 4  TYPE IPLD 1
Pan 210 degrees
Tilt 120 degrees
Color Position 2
Image Bank 2
Image Rotate 90 degrees
Intensity 100 percent
```

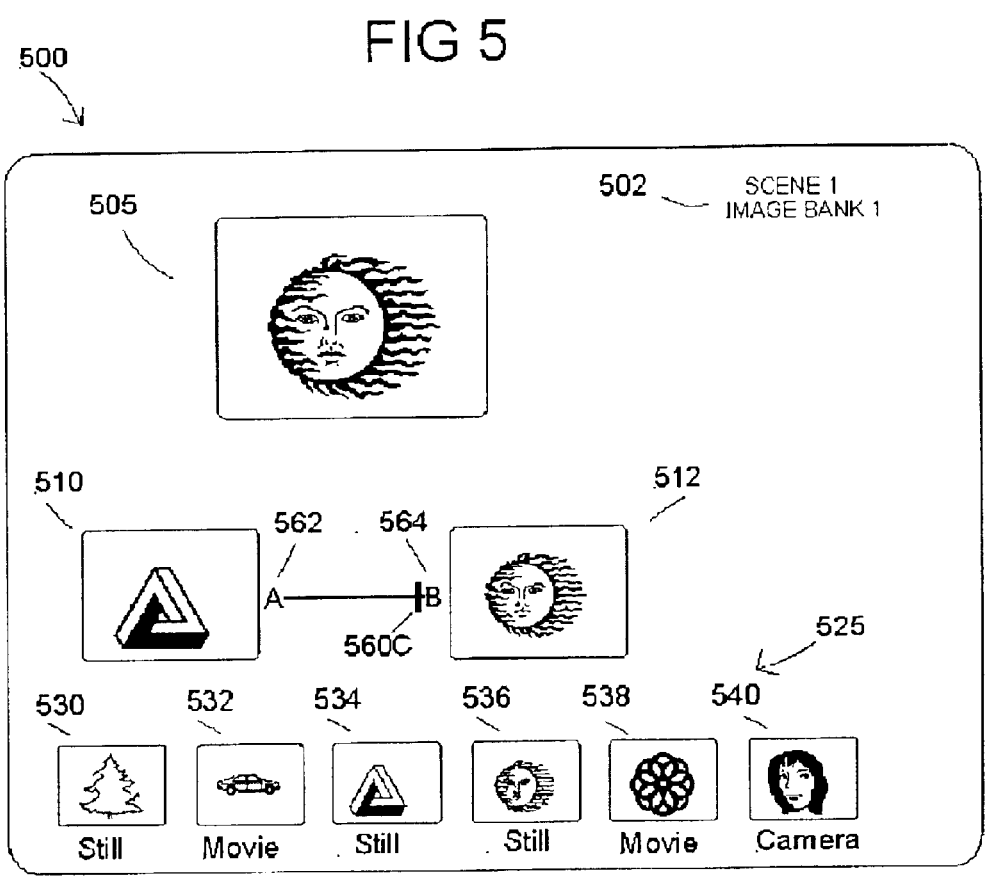

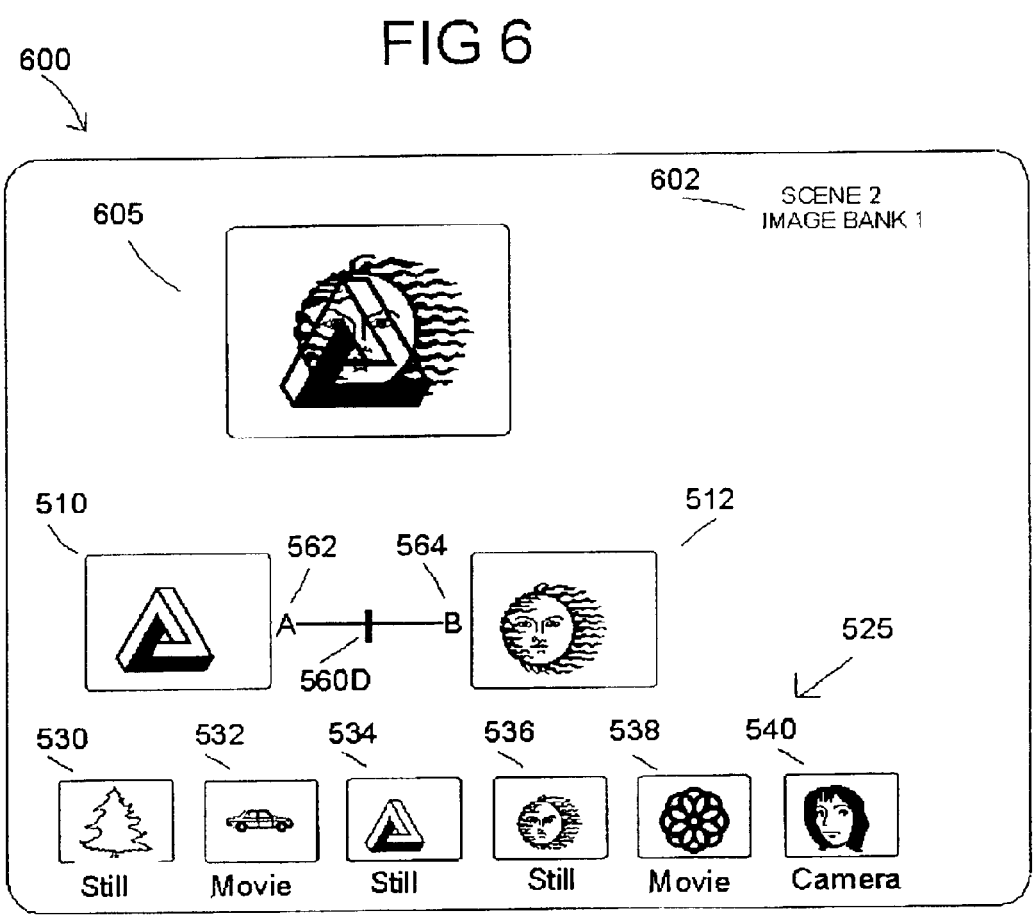

METHOD AND APPARATUS FOR CONTROLLING IMAGES WITH IMAGE PROJECTION LIGHTING DEVICES

BACKGROUND OF THE INVENTION

1. Field of the Invention

The present invention relates to lighting systems, and more particularly to the control of images in a lighting system that includes multiparameter lights having an image projection lighting parameter.

2. Description of the Related Art

Lighting systems are formed typically by interconnecting many light fixtures by a communications system and providing for operator control from a central controller. Such lighting systems may contain multiparameter light fixtures, which illustratively are light fixtures having individually remotely adjustable parameters such as beam size, color, shape, angle, and other light characteristics. Multiparameter light fixtures are widely used in lighting industry because they facilitate significant reductions in overall lighting system size and permit dynamic changes to the final lighting effect. Applications and events in which multiparameter light fixtures are used to great advantage include showrooms, television lighting, stage lighting, architectural lighting, live concerts, and theme parks. Illustrative multiparameter light devices are disclosed in the product brochure entitled "The High End Systems Product Line 2001" and are available from High End Systems, Inc. of Austin, Tex.

To program the multiparameter lights, the operator inputs to a keyboard of the lighting central controller (or central controller) to send commands over the communications system to vary the parameters of the lights. When the operator of the lighting central controller has set the parameters of the multiparameter lights to produce the desired effect, the operator has produced a "scene." Each scene with its corresponding parameter values is then stored in the memory of the central controller for later recall by the operator or as an automated recall. As many as 100 or more scenes may be put together to make a "show".

Prior to the advent of relatively small commercial digital controllers, remote control of light fixtures from a central controller was done with either a high voltage or low voltage current; see, e.g., U.S. Pat. No. 3,706,914, issued Dec. 19, 1972 to Van Buren, and U.S. Pat. No. 3,898,643, issued Aug. 5, 1975 to Ettlinger. With the widespread use of digital computers, digital serial communications has been adopted as a way to achieve remote control; see, e.g., U.S. Pat. No. 4,095,139, issued Jun. 13, 1978 to Symonds et al., and U.S. Pat. No. 4,697,227, issued Sep. 29, 1987 to Callahan.

A multiparameter light has several parameters that can be adjusted by remote control. A central controller is used in combination with a communication system to remotely control the multiparameter lights. Typically, the central controller is programmed in advance by an operator to control the lighting system. An example of a widely used central controller for multiparameter lights is the Whole Hog II, which is manufactured by Flying Pig Systems of 53 Northfield Road, London W13 9SY, and disclosed in a product brochure entitled "Whole Hog II, Lighting Control Workstation" available from Flying Pig Systems. Examples of some of the parameters that can be remotely controlled are position, color, pattern, iris, dimming, and shutter to name a few. Multiparameter lights can have over 12 parameters that are controlled by the central controller. Each multiparameter light can be set to respond to a specific address in the protocol used over the digital serial communication system. Typically the multiparameter light is first addressed by an operator of the central controller and next a parameter of the multiparameter light is adjusted from the central controller by the operator.

Multiparameter lights typically use metal or glass masks to act as a slide for the projection of an image. The metal or glass masks made for the lights are referred to in the industry as "gobos". Typically a gobo is placed into the light path within the housing of the multiparameter light by a motor or other type of actuator. The actuator turns a wheel referred to as a "gobo wheel" that contains multiple apertures, and each aperture contains a gobo that can be placed into the light path. The actuator is controlled by the electronic system of the multiparameter light in response to commands received over the communication system from the central controller. Each gobo aperture in some multiparameter lights can rotate the gobo itself in the path of the light. Additional description of gobo technology can be found in my U.S. Pat. No. 5,402,326 entitled "Gobo holder for a lighting system," which issued Mar. 28, 1995.

A type of advanced multiparameter light fixture which is referred to herein as an image projection lighting device ("IPLD") uses a light valve to project images onto a stage or other projection surface. A light valve, which is also known as an image gate, is a device such as a digital micro-mirror ("DMD") or a liquid crystal display ("LCD") that forms the image that is projected. Other types of light valves are LCOS and MEMS. U.S. Pat. No. 6,057,958, issued May 2, 2000 to Hunt, discloses a pixel based gobo record control format for storing gobo images in the memory of a light fixture. The gobo images can be recalled and modified from commands sent by the control console. U.S. Pat. No. 5,829,868, issued Nov. 3, 1998 to Hutton, discloses storing video frames as cues locally in a lamp, and supplying them as directed to the image gate to produce animated and real-time imaging. A single frame can also be manipulated through processing to produce multiple variations. Alternatively, a video communication link can be employed to supply continuous video from a remote source.

U.S. Pat. No. 5,828,485, issued Oct. 27, 1998 to Hewlett, discloses the use of a camera with a DMD equipped lighting fixture for the purpose of following the shape of the performer and illuminating the performer using a shape that adaptively follows the performer's image. The camera acquiring the image preferably is located at the lamp illuminating the scene in order to avoid parallax. The image can be manually investigated at each lamp or downloaded to some central processor for this purpose. This results in a shadowless follow spot.

Since multiparameter light fixtures of the type that project an image using a gobo typically use gobo wheels to place various gobos into the light path, and since a gobo wheel typically has several positions, it is common for the central controller to display to the operator a position number of the gobo wheel on some type of visual display device. The visual display device may be a CRT monitor or LCD touch screen or the like. The gobo parameter selectively varied with the use of the gobo wheel of the prior art typically is referred to as the gobo parameter or gobo position parameter.

FIG. 1 shows a central controller 110 and multiparameter lighting devices 120 and 122 of the gobo type. A display device 150, a keyboard 140 for entering control commands, and control input devices 145 are shown as part of the central controller 110. A communications line 116 interconnects the central controller to the multiparameter lighting device 120. Communications line 121 is connected between light 120 and light 122 so that light 122 can also receive communications from the central controller 110. Only two multiparameter lighting devices are shown in FIG. 1 although it is known in the art to interconnect 30 or more devices for larger shows.

Multiparameter lights 120 and 122 have several parameters that can be adjusted from the central controller 110. For simplification, lights 120 and 122 are considered the same fixture type and include the following variable parameters: pan, tilt, color, gobo, gobo rotate, and intensity. The operator of the central controller sets the correct fixture type within the central controller software, and sets up the central controller to control the two lights 120 and 122.

FIG. 2 shows a condensed version of a display screen 200 (analogous to the display device screen 150 of FIG. 1) for scene one. With the display screen 200 the parameters of the lights 120 and 122 may be varied. The operator may move a cursor on the display screen 200 using, for example, any suitable input device (not shown) to select the line of the parameter of the specific fixture to be varied. The operator may also use one of the input devices 145 or keyboard 140 to vary the selected parameter. When the operator has adjusted all of the desired parameters of the lights, the operator has created a scene. Next the operator may advance the screen to the next scene and adjust the parameters. Once the desired number of scenes have been created, the operator may recall the scenes during a live performance or show to obtain a pleasing visual effect.

The parameter information shown on the visual display screen 200 is condensed for simplicity. Typically, a display would include many more fixtures of different fixture types. It is also known to display the duration time of a scene and any crossfade time between scenes. For example the time that a first scene fades into a second scene.

A typical example of how the visual display of the gobo wheel position number may be used by the operator during advanced programming of the central controller is as follows. The operator first selects the operating address of one of the multiparameter light fixtures to modify a parameter. Next the operator modifies the chosen parameter. For example, the operator sees on the display device screen a list of parameters that can be selected for modification of the particular light chosen, and then selects a parameter to modify such as "color wheel." If the color wheel happens to have ten apertures to choose from, the operator may choose aperture 3 which happens to be green. The operator may continue the programming by addressing other multiparameter lights and change the color parameter to aperture 3 or even other apertures. The operator typically sees the aperture number on the visual display device screen, but might instead see the colors of the apertures instead of just numbered apertures if the central controller has in its memory the "fixture type" for the particular light being controlled. Central controllers like the Whole Hog II are capable of pre-storing "fixture types" in the controllers memory. A fixture type is all the particular attributes of a specific manufacturers brand or model of multiparameter light.

Unfortunately, one problem with displaying aperture colors from information pre-stored at the central controller arises when, for example, a service technician removes the green color filter of aperture 3 of a specific fixture type and replaces it with a custom color. Now unless the fixture type information is updated at the central controller, the visual display device screen at the central controller will still show green for aperture 3 instead of the custom color.

Gobo wheel aperture selection in the prior art has problems similar to those involved in color wheel aperture selection as described above. The gobos that are mounted to the gobo wheel apertures of a particular fixture type do not change unless a service technician exchanges a gobo from one of the apertures with a custom gobo that may have been specified by the operator or show lighting designer. The gobo pattern images of the prior art cannot be changed to different patterns electronically like images can be changed when IPLD lighting devices change images using light valves.

The use of IPLDs in a lighting system avoids some of the problems with the types of multiparameter lights that use color wheels and gobos but introduces new problems. Unlike multiparameter lights that have a fixed number of gobos that the operator can easily choose from when programming an IPLD from a central controller, IPLD lighting devices are capable of being used to project a wide range of different images, some of which may be pre-stored internally but some of which may not be pre-stored. The techniques used by conventional central controllers to program multiparameter lights do not work as effectively as might be desired for programming IPLD lighting devices. Moreover, while the type of light fixture that provides a shadowless follow spot function and other types of light fixture that similarly store images internally for projection have value in the lighting industry, these types of light fixtures and/or the lighting systems in which they operate all limit the operator of the lighting system to carrying out image projection operations on the basis of individual light fixtures. Moreover, having to store images at the light fixture is very limiting to the user of the device, since the operator must upload images to the light fixture from a computer before placing the light fixture into service.

An example of a type of stage lighting projection system that uses a double mirror orbital head and a video projector is disclosed in International Publication No. WO 02/21832, published Mar. 14, 2002. The system uses an image processor to correct for the expected rotation and other distortion effects that would otherwise result from an image passing through the double mirror head. Image data from an image store is provided to the image processor along a video link. Orientation of the double mirror head is effected by a signal from a computer controller to the head over a DMX link. The controller then directs a DMX processing signal to the image processor, which processes the image data so as to introduce a correction for the expected rotation and other distortion effects. The controller also directs a DMX signal to the head to effect a desired focus and zoom. The processed image data from the image processor then is provided via a video link to the image projector, so that the image is projected with desired orientation, focus, zoom and appearance. A similar system known as the Catalyst™ system is available from High End Systems, Inc. of Austin, Tex., and is described in the Catalyst system brochure. While the Catalyst system has met with some success, use of the image store is cumbersome and generally unfamiliar to many operators of lighting systems, and increases the setup complexity of the lighting system.

A multiprojector system in which an image is projected by plural projectors is disclosed in U.S. Pat. No. 5,988,817. The multiprojector system uses a number of "image-inputting" devices, one for each image that is to be projected by the projectors. The images to be projected are furnished to a multiple video processor, from which they are directed to the projectors. Where an image is to be enlarged and projected by two, four or more projectors, the image is enlarged in the multiple video processor before being supplied to the projectors. Disadvantageously, the use of multiple image-inputting devices and a multiple video processor is generally unfamiliar to many operators of lighting systems, and increases the setup complexity of the lighting system.

SUMMARY OF THE INVENTION

A need exists for a central controller that can more easily program the image parameter of IPLD lights from the central controller, yet provide a wide range of images.

A need exists for a central controller that is compatible with multiparameter lights with fixed gobo wheels as well as IPLDs with infinitely variable images, and that is reasonably intuitive to the operator of the lighting system.

A need exists for a method of programming of the IPLDs by an operator that is reasonably expedient and flexible so as to reduce labor time and allow creativity.

A need exists generally to improve the various problems described above in the "Background" section, as well as other problems in the prior art.

Advantageously, a central controller and lighting system in accordance with the present invention is capable of operating multiple IPLDs as well as other types of multiparameter lights. Advantageously, the structure of the programming screen is similar to that of earlier programming screens to help the operator of the central controller learn quickly. Advantageously, a central controller of the present invention may be designed to accommodate any of a variety of digital communications system.

One or more of these perceived needs is/are addressed by each of the various embodiments of the present invention. One embodiment of the present invention is a method of controlling a lighting system having at least a plurality of IPLDs, comprising displaying a first plurality of parameters of a first one of the IPLDs at a central controller, the first plurality of parameters including a first image parameter; displaying a first plurality of images at the central controller; and establishing at the central controller at least one first image for the first image parameter from the first plurality of images.

Another embodiment of the present invention is a method of controlling a lighting system having at least a plurality of IPLDs, comprising displaying a first plurality of parameters of a first one of the IPLDs at a central controller, the first plurality of parameters including a first image parameter; displaying a first plurality of images at the central controller in response to an operator selection of the first image parameter; and originating from the central controller at least one first image for the first image parameter from the first plurality of images.

A further embodiment of the present invention is a method of operating a lighting system that includes a central controller and a plurality of image projection lighting devices ("IPLDs"), comprising maintaining a plurality of parameters for each of the IPLDs at the central controller, the parameters for each of the IPLDs including at least one image parameter; originating a first image from the central controller for a first one of the IPLDs, the first image being defined by the image parameter of the first IPLD; and originating a second image from the central controller for a second one of the IPLDs, the second image being defined by the image parameter of the second IPLD. The first image and the second image are different.

Another embodiment of the present invention is a method of operating a lighting system that includes a central controller and a plurality of image projection lighting devices ("IPLDs"), comprising originating a first image from the central controller for a first one of the IPLDs; projecting the first image from the first IPLD; originating a second image from the central controller for a second one of the IPLDs, the second image being different than the first image; and projecting the second image from the second IPLD. The first image and the second image are selected from a plurality of images stored at the central controller, the plurality of images having have an identifying scheme for operator visualization of the images.

Another embodiment of the present invention is a lighting system comprising a plurality of multiparameter lights, including at least first and second image projection lighting devices ("IPLDs"); a central controller; and a communications system interconnecting the central controller with the multiparameter lights. The central controller comprises a memory containing a plurality of images; and a programmable component for selecting a first one of the images for projection by the first IPLD and for selecting a second one of the images for projection by the second IPLD.

A further embodiment of the present invention is a method of operating a lighting system that includes a central controller and a plurality of image projection lighting devices ("IPLDs"), comprising originating a first image from the central controller for a first one of the IPLDs, the first image resulting from a crossfade between two different images; projecting the first image from the first IPLD; originating a second image from the central controller for a second one of the IPLDs, the second image being different than the first image and resulting from a crossfade between two different images; and projecting the second image from the second IPLD. The first image and the second image are respectively formed from a crossfade between at least two of a plurality of images stored at the central controller.

Another embodiment of the present invention is a central controller for controlling a lighting system comprising a plurality of image projection lighting devices ("IPLDs"), each having a plurality of parameters including an image parameter. This central controller comprises a display screen; a memory containing a plurality of images; a first programmable component for creating a first display on the display screen of at least some of the images; a second programmable component for forming a first image from the first display, under operator control, for an image parameter of a first one of the IPLDs; a third programmable component for creating a second display on the display screen of at least some of the images; and a fourth programmable component for forming a second image from the second display, under operator control, for an image parameter of a second one of the IPLDs. The first image and the second image are different.

Another embodiment of the present invention is a method of controlling a lighting system, the lighting system having a central controller and at least a plurality of IPLDs and each of the IPLDs having a plurality of parameters including an image parameter. This method comprises selecting a first one of the IPLDs at the central controller; editing the image parameter of the first IPLD at the central controller to visualize a first image on a visual display device of the central controller; establishing a first effect for the first image; visualizing a first final image on the visual display device, the first final image comprising the first image with the first effect as being projected by the first IPLD; selecting a second one of the IPLDs at the central controller; editing the image parameter of the second IPLD at the central controller to visualize a second image on the visual display device; establishing a second effect for the second image; and visualizing a second final image on the visual display device, the second final image comprising the second image with the second effect as being projected by the second IPLD.

A further embodiment of the present invention is a method of operating a lighting system that includes a central controller and a plurality of image projection lighting devices ("IPLDs"), comprising maintaining a plurality of parameters for each of the IPLDs at the central controller, the parameters for each of the IPLDs including at least one image parameter; originating a first image from the central controller for a first one of the IPLDs, the first image being defined by the image parameter of the first IPLD; and originating a second image from the central controller for a second one of the IPLDs, the second image being defined by the image parameter of the second IPLD. The first image and the second image are first and second sections of a collage.

Another embodiment of the present invention is a method of operating a lighting system that includes a central controller, a plurality of first-type multiparameter lights having a plurality of parameters except for an image parameter, and a plurality of second-type multiparameter lights having a plurality of parameters including an image parameter. This method comprises varying the parameters for each of the first-type multiparameter lights at the central controller and varying the parameters for each of the second-type multiparameter lights at the central controller. For each of the second-type multiparameter lights, varying the particular image parameter thereof comprises originating a first image from the central controller for a first scene, the first image being defined by the particular image parameter; and originating a second image from the central controller for a second scene, the second image being defined by the particular image parameter.

A further embodiment of the present invention is a method of operating a lighting system that includes a central controller and a plurality of image projection lighting devices ("IPLDs"). This method comprises displaying a plurality of parameters for each of the IPLDs at the central controller, the parameters including at least one image parameter; evoking a graphics tool at the central controller in response to selection of one of the IPLDs by operator action; displaying a plurality of images for the graphics tool at the central controller; and originating an image from the central controller for the image parameter of the selected IPLD, in response to operator action with the graphics tool, from the plurality of images.

Another embodiment of the present invention is a method of operating a lighting system that includes a central controller and a plurality of image projection lighting devices ("IPLDs"). This method comprises displaying a plurality of parameters for each of the IPLDs at the central controller, the parameters including at least one image parameter; evoking a first graphics tool at the central controller in response to selection of a first one of the IPLDs thereof by operator action; displaying a plurality of images for the first graphics tool at the central controller; originating an image from the central controller for the image parameter of the first IPLD, in response to operator action with the first graphics tool, from the plurality of images; evoking a second graphics tool at the central controller in response to selection of a second one of the IPLDs by operator action; displaying a plurality of images for the second graphics tool at the central controller; and originating an image from the central controller for the image parameter of the second IPLD, in response to operator action with the second graphics tool, from the plurality of images for the second graphics tool.

A further embodiment of the present invention is a method of operating a lighting system that includes a central controller and a plurality of image projection lighting devices ("IPLDs"). This method comprises displaying a plurality of parameters for each of the IPLDs at the central controller, the parameters including at least one image parameter; evoking a first graphics tool at the central controller in response to selection of a first one of the IPLDs by operator action; displaying a plurality of images for the first graphics tool at the central controller; originating a first sectional image of a collage from the central controller for the image parameter of the first IPLD, in response to operator action with the first graphics tool, from the plurality of images; evoking a second graphics tool at the central controller in response to selection of a second one of the IPLDs by operator action; displaying a plurality of images for the second graphics tool at the central controller, including a second sectional image of the collage; and originating a second sectional image of the collage from the central controller for the image parameter of the second IPLD, in response to operator action with the second graphics tool, from the plurality of images for the second graphics tool.

Another embodiment of the present invention is a method of controlling a lighting system comprising a plurality of multiparameter lights, including gobo-type multiparameter lights and IPLD-type multiparameter lights, controllable from a central controller. This method comprises storing at least one image library at the central controller; displaying at the central controller an identifier and a plurality of parameters for each of the multiparameter lights, wherein the parameters for each of the IPLD-type multiparameter lights includes an image parameter; displaying an image editor at the central controller in response to an operator selection of any of the IPLD-type multiparameter lights, the image editor including an image library area having a plurality of images, a mixer area, and an image area; selecting at least two of the plurality of images from the image library in response to an operator action; mixing the selected images in the mixer area to obtain an output image; displaying the output image in the image area; and transmitting the output image from the central controller to the IPLD.

BRIEF DESCRIPTION OF THE SEVERAL VIEWS OF THE DRAWINGS

FIG. 2 is a pictorial drawing of prior art display text on a display screen of the central controller of FIG. 1.

FIG. 3 is a schematic diagram of a lighting system and central controller, in accordance with the present invention.

FIG. 4 is a pictorial drawing of display text on a display screen of the central controller of FIG. 3.

FIG. 5 is a pictorial drawing of a display on a display screen of the central controller of FIG. 3, the display showing image bank 1 for scene 1 and the assignment of an image output to that particular image bank, in accordance with the present invention.

FIG. 6 is a pictorial drawing of a display on a display screen of the central controller of FIG. 3, the display showing image bank 1 for scene 2 and the assignment of another image output to that particular image bank, in accordance with the present invention.

DETAILED DESCRIPTION OF THE INVENTION, INCLUDING THE BEST MODE

Figure 1:
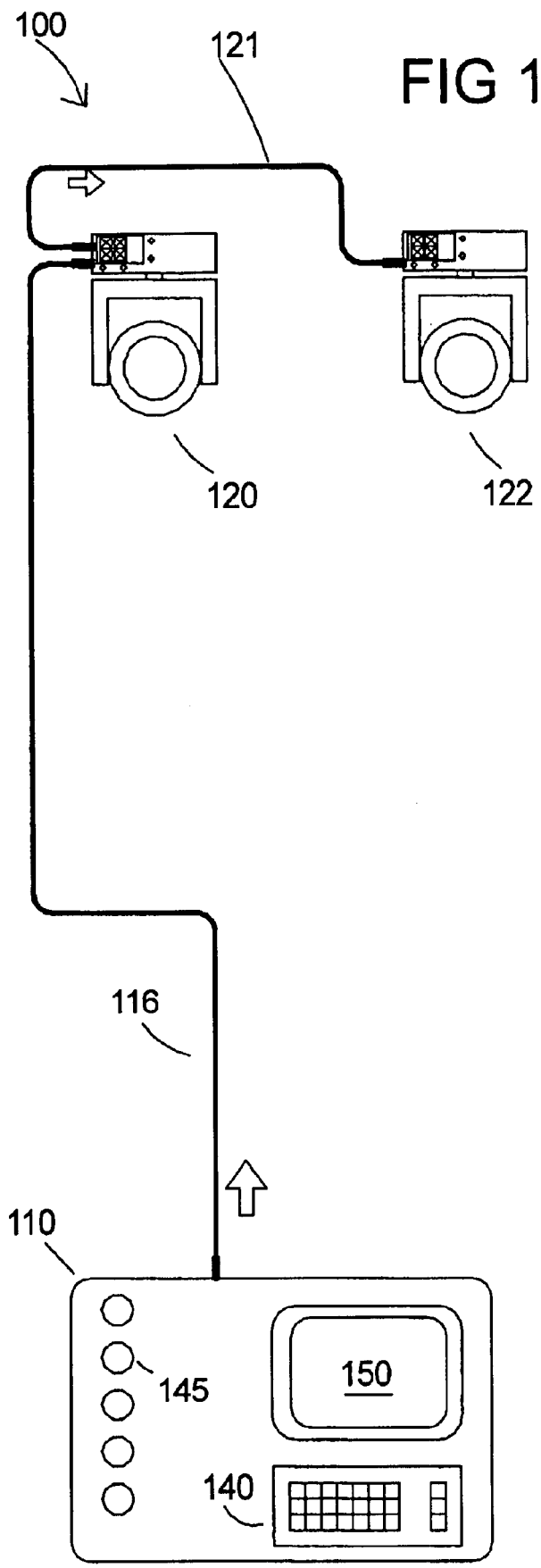
FIG. 1 is a schematic diagram of a lighting system of the prior art.

A lighting system includes a central controller and a plurality of image projection lighting devices, or "IPLDs." The central controller is preferably microprocessor-based and programmable, and includes at least one visual display device. One type of display at the central controller is the image parameters for the IPLDs, and this display is used to evoke a display of graphics tools at the central controller for originating images. Images originating at the central controller are transmitted to the IPLDs without necessarily being stored in the IPLDs for later recall. An image is considered as originating from the central controller if it is created from one or more images selected from a plurality of images displayed in a graphical form at the central controller. Transmission of the image file for the final image may be performed by or controlled by the central controller. The process of creating the final image may, if desired, involve manipulating the selected image or images used to create the final image, by or under control of the central controller. The sources of the selected images may be local to the central controller, such as from a hard drive or other memory of the central controller, from peripherals of the central controller such as a video disk player, CD-ROM drive, DVD drive, tape drive, and so forth, from networked devices such as servers, cameras, and large capacity storage devices, from the Internet, or from any combination of the foregoing. The central controller is provided with one or more image editors. The image editors include tools for selecting one or more images from one or more image libraries and for manipulating the selected image or images in various ways, such as in any one or more of the following: mixing two or more images, adding special effects, trimming, resizing, and so forth. The outputs of the image editors, which are referred to as "image banks," are routed to multiple multiparameter lights (including IPLDs) in accordance with assignments made by the operator of the central controller. The central controller may have only one visual display device, or may have two or more visual display devices for displaying the image editors and to provide other information and visual feedback to the operator. Suitable visual display devices include CRT screens, LCD and TFT screens, personal viewing devices, display projectors, and other types of devices capable of showing information to the operator. The image-editing central controller allows the operator to control all types of multiparameter lights, including conventional gobo light fixtures as well as IPLDs, from a single point with intuitiveness and expediency, thereby enabling the operator to be both more productive as well as more creative.

Preferably the central controller is provided with sufficient processing power and memory capability to store and manipulate a great many image files to the desired degree of resolution. However, in an alternative embodiment, the image files may be stored on a physically separate computer or server that is suitably networked to the central controller. In this alternative embodiment, the full image files or reduced image files are rapidly transmitted to the central controller for selection and possibly manipulation by the operator using the graphics tools at the central controller. The final full resolution image may be created at and transmitted from the central controller, or may be created at and transmitted from the separate computer or server in accordance with commands from the central computer based on operator actions with the graphics tools. The separate computer or server in this alternative embodiment preferably operates completely transparently to the operator.

The central controller also uses a collage display screen of a collage generator to allow the operator to select an image to collage as well as determine how many sectional images will be involved in a collage. The term "collage" as used herein means a single image made from multiple projections from IPLDs. The sectional images for the multiple projections may be any type of images, but preferably images originating from one image library. They may be created by the operator using the collage generator, or may be predefined. Several IPLDs are collaborated to project a single image from the several sectional images. Each IPLD projects a separate sectional image, or a partial image of the final image. In this way one very large projection can be made using multiple sectional images from multiple IPLDs. This is an advantage as several IPLD can act together to project one larger image, and the total luminous output of the single image is multiplied by the number of IPLDs.

FIG. 3 shows an illustrative lighting system 300 having a novel central controller 310 suitable for operating multiple image editors, and which may additionally be provided with many if not all of the same features as found in conventional central controllers. The central controller 310 has multiple display screens 350 and 375, input devices 345, and keyboard 340. The central controller 310 illustratively supports two communication lines 116 and 316. The communication line 116 along with line 121 link the multiparameter lighting devices 120 and 122, which illustratively are of the gobo type, to the central controller 310. The communications lines 116 and 121 illustratively are of the DMX type, but could be other types of control lines. Preferably, line 316 is a high bandwidth line and the communications carried over line 316 is suitable for use with IPLDs such as IPLDs 320 and 322. A description of multiple communication systems for multiparameter lights and the advantages thereof is provided in U.S. Pat. No. 6,331,756 entitled "Method and Apparatus for Digital Communications with Multiparameter Light Fixtures," which issued Dec. 18, 2001 and hereby is incorporated herein by reference in its entirety. A suitable system, method and apparatus for communicating image content from a central controller to one or more IPLDs and between IPLDs under control of a central controller are described in my pending U.S. application Ser. No. 10/090,926 entitled "Method, Apparatus and System for Image Projection Lighting," which was filed Mar. 4, 2002 and hereby is incorporated herein by reference in its entirety.

Illustratively, multiparameter lights 320 and 322 are of the IPLD type. Communication line 316 communicates with a network hub 318 that in turn relays communication via lines 319 and 321 to the IPLDs 320 and 322 respectively. Communication line 116 extends from the central controller 310 to the multiparameter light 120, and communication line 121 extends between the multiparameter light 120 and the multiparameter light 122. Although the central controller 310 is shown as having two communication lines 116 and 316 which may use two different communication systems, alternative central controller may be restricted to just one communication line, or may be expanded to include more than two communication systems or signal lines to various individual or groups of lighting fixtures. For example, each IPLD may, if desired, be linked to the central controller over a dedicated communications line. Moreover, the lighting system 300 may include other types of lighting devices, including the DMD equipped lighting fixtures with attached camera used for following the shape of the performer as disclosed in the aforementioned Hewlett patent.

FIG. 4 shows a condensed version of one of the display screens of the central controller 310 of FIG. 3. The display screen (or programming screen) 400 of FIG. 4 (illustratively display screen 375 of FIG. 3) illustratively shows scene 1. The display screen 400 integrates different fixture types such as TYPE P1 with predefined gobos and TYPE IPLD 1 with unrestricted images using a light valve. Since the IPLDs are able to project an infinite number of images and are not necessarily predefined as are the gobos of TYPE P1, the display screen 400 has been simplified to use "Image Banks" for the image parameter of the IPLDs. The term "image bank" refers to the set of one or more consecutive images that is sent to an IPLD from the central controller. The central controller may have several image banks available for the IPLDs depending on the structure of the IPLD and the communication system used.

FIG. 4 shows that FIXTURE 3 TYPE IPLD 1 has its image parameter assigned to Image Bank 1, and FIXTURE 4 TYPE IPLD 1 has it image parameter assigned to Image Bank 2. Being a text-base display that is structured in a manner similar to the display on the screen 200 of FIG. 2, the display screen 400 presents a familiar type of display to the operator, thereby allowing the operator to have a faster learning curve with respect to the novel aspects of the display screen 400 and other novel displays described herein. Advantageously, operators should intuitively understand how to vary all parameters. It will be appreciated that a text display may, if desired, include icons and other simple suggestive graphics to assist the operator.

The display screen 400 arises from the set up phase. During the set up phase for the central controller 310, the operator inputs to the central controller the fixture types to be used and the number of each fixture type. For example, for the lights used in FIG. 4, the operator during set up, types in two each of TYPE P1 and two each of TYPE IPLD 1. When Scene 1 is called up for the first time on the text display screen 375 (FIG. 3), all the fixture types and number of fixtures are listed. Preferably the parameter values are defaulted to some known expected value; for example, the values for the parameters of FIXTURE 1 TYPE P1 might default to Pan 180 degrees, Tilt 180 degrees, Color Position 1, Gobo Position 1, Gobo Rotate 180 degrees, and Intensity 0 percent. When creating Scene 1 for the first time, the operator need only adjust the "values" and need not type in anything else. The operator next displays an image editor for a particular image bank on the graphic display screen 350 (FIG. 3) by selecting the particular IPLD of interest, which illustrative is accomplished by performing a selection event such as a mouse click, keyboard code, or oral command for the IPLD of interest such as, for example, by clicking on the line "FIXTURE 3 TYPE IPLD 1" or the line "Image Bank 1" under the line "FIXTURE 3 TYPE IPLD 1." If the operator wishes to change the image bank displayed on display screen 350 from Image Bank 1 to Image Bank 2, he only need change the "value" of the image bank on FIXTURE 3 TYPE IPLD 1 display screen 375. It will be appreciated that the description herein of the specific content, layout, and manner of interacting with the displays 350 and 375 is illustrative, there being many other techniques that are suitable for achieving the same functionality.

FIG. 5 is a pictorial drawing of a display of a display screen 500 (illustratively display screen 350 of FIG. 3) of the central controller 310 of FIG. 3. The display screen 500 is an image editor that includes image mixing functionality. Image mixer programs, which are well known in the computer graphic arts, let the graphic artist choose from various image content for output on to a screen either as single selected image or as a mixed image. One example of a video mixer is the Motion Dive 3 product, which is manufactured by Digital Stage of Japan and is disclosed at www.motion-dive.com. The term "content" is a general term that refers to various types of works. The term "image" is a general term that refers to a wide variety of content type, including continuous video images such as movies and animation, graphic effects, and news programs, and still images such as still clips, pictures, clip art, sketches, and so forth.

The image editor of the display screen 500 is associated with Image Bank 1. This association is shown at 502 in FIG. 5, and is also shown in the display screen 400 of FIG. 4 under the heading FIXTURE 3 TYPE IPLD 1. During creation of Scene 1, the operator varies the parameters of the desired fixtures. When the operator selects the IPLD to be varied, the display screen 500 promptly shows the operator the image editor for the selected image bank and for the current scene. In FIG. 5, for example, the display 500 includes a notation at reference numeral 502 that the image bank selected is Image Bank 1, and the current scene is Scene 1.

The image editor display screen 500 shows a main output area 505 of the Image Bank 1. This is what the operator first looks at to determine what the selected IPLD image parameter is assigned to. The areas 510 and 512 contain images that have been selected from a number of images shown below them in areas 530, 532, 534, 536, 538 and 540, which are thumbnail representations of full images contained in an image library. Any of the images in the image library of an image editor can be visualized by the operator. The areas 510 and 512 are used to indicate which images from the image library are selected and placed into a premixed state, and are herein referred to as premix windows. Images may be selected from the image library by dragging them into the premix windows with a mouse or trackball as is well known in the computer arts, or from an input from one of the input devices of the central controller. For convenience, one of the premix windows, for example the premix window 510, is referred to as the "A" window and is so designated by screen notation 562. The other one of the premix windows, for example the premix window 512, is referred to as the "B" window and is so designated by screen notation 564. A graphical bar-shaped "slider" cursor 560C is moved between the "A" and "B" screen notations to vary the amounts of image A and B in the premix that is sent to the main output window 505. The slider 560C is shown moved to the B notation so that the B image is fully shown on the main output area 505. This image is the image that is available as the Image Bank 1, Scene 1 image when the image parameter of the IPLD is selected to Image Bank 1 on 400 of FIG. 4. It will be appreciated that the use of premix windows 510 and 512, the slider cursor 560, and the A and B notations 562 and 564 are illustrative, and that many different styles of controls and notation may be used to perform the premixing function. For example, selected images may be indicated by highlighted frames and the amount of premixing may be set by numerical values or by positioning an indicator within a geographic shape whose vertices are defined by the number of images selected (a triangle for three images, a square for four, a pentagon for five, and so forth).

The image library for a particular image bank, for example, images 530, 532, 534, 536, 538 and 540 for the Image Bank 1, can be placed into the image editor by the operator in advance of doing a show and operating the fixtures. New images can be added during a show, including images acquired from cameras mounted on the IPLDs or even images downloaded from the Internet. Although the image library shown in display screen 500 of FIG. 5 contains only six images, hundreds of images could be kept in any one image library. Techniques well know in the computer arts may be used to manage large image libraries, including scrolling and layering.

Images that are particularly suitable for inclusion in an image library include stills, video (including movies and animations), and camera stills and movies. The image editor may mix images located in the premix windows that are still, animated (video) or from a camera. The still images may be pictures, graphics, or masks. Identifiers for the type of library image may be in the form of written identification as shown under the images 530, 532, 534, 536, 538 and 540 in the display screen 500 of FIG. 5, or the images may be surrounded by particular borders or colors corresponding to the type of image. The camera image 540 may originate from a camera connected to the central controller through any suitable means; for example, the camera image may originate from an IPLD that contains a camera. The identification scheme for the images in the image library may include file numbers, address numbers and the like that make the identification and origination easily determinable to the operator.

The image library may use any suitable image source such as computer files, graphic generators, networked servers and storage devices, the memories of IPLDs in the lighting system, and external inputs to the central controller such as cameras, magnetic tape, video disks, video games, CD-ROM, DVD, or the like. The image library may be set up to contain images unique to various image banks, as well as images common to two or more image banks. In this way a complete set of images or a change of some of the images is available for different image banks assigned to different IPLDs.

The central controller 310 uses image data selected by an operator from the image library to originate and send images to the IPLDs. It will be appreciated that in addition to originating image data, the central controller 310 may operate in other ways. For example, the central controller 310 may control the routing of an image from one IPLD to another or from a separate image server to an IPLD while entirely bypassing the central controller 310. When the central controller 310 originates an image, the IPLD that is projecting the image need not store the image, although it may buffer the image for communication purposes or for display purposes in a display buffer in a manner well known in the art. Buffering may also take place in a communication line during an image transfer, as is well known in the communications arts.

Although separate graphics and text display screens 350 and 375 respectively are described for the parameter adjustment of the lighting fixtures (400 of FIG. 4) and the image editor (500 of FIG. 5), the two visual display screens may be combined into one if desired. However, separate screens are believed to be easier for an operator to use.

FIG. 6 shows the same image editor for Image Bank 1 as that shown in FIG. 5, except that the current scene is now Scene 2. In Scene 2, the operator has moved the slider cursor from 560C (FIG. 5) to 560D (FIG. 6). At this location of the slider cursor 560, the premix window 510 "A" and 512 "B" have their images mixed together to form a mixed image. The resultant mixed image is shown in the main output area 605, and this mixed image is the one available at the image parameter of the IPLD with Image Bank 1 selected for Scene 2. Scene 2 is displayed as 602 of the display screen 600 of FIG. 6.

Figure 7:
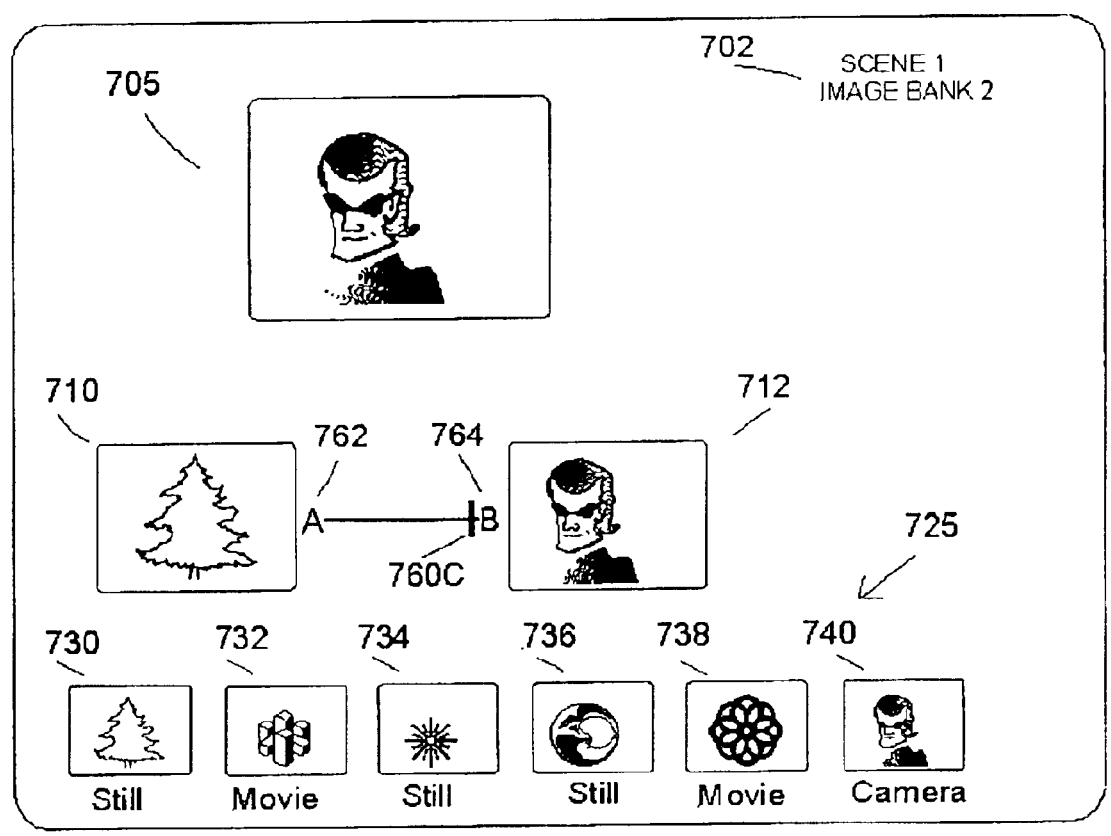
FIG. 7 is a pictorial drawing of a display on a display screen of the central controller of FIG. 3, the display showing image bank 2 for scene 1 and an assignment of an image output to that particular image bank, in accordance with the present invention.

FIG. 7 display screen 700 shows the image editor for Image Bank 2 Scene 1. If we refer back to FIG. 4 display screen 400, we see that FIXTURE 4 TYPE IPLD 1 has its image parameter assigned to Image Bank 2. When fixture 4 is selected, the visual display such as 350 of FIG. 3 promptly shows the image editor for Image Bank 2 (image editor display screen 700 of FIG. 7). This can be done any time an IPLD fixture is selected by the operator for editing the parameters, or just for viewing the current status of the parameters. Another way is for the visual display such as 350 of FIG. 3 to promptly show the image editor only when the actual image parameter is being adjusted. This may leave the visual display that displays the image editor open to display other functions. In the preferred version, the display such as 350 of FIG. 3 shows the image editor for the selected image bank as soon as the IPLD fixture is selected by the operator.

The image library of the image editor of Image Bank 2 shown as 700 in FIG. 7 has library images 725, some of which are different than the images of the image editor of Image Bank 1. Illustrative library images 730, 732, 734, 736, 738 and 740 are shown. The library image 730 has been dragged or dropped to premix "A" window 710. The library image 740 has been dragged or dropped to premix "B" window 712. A slider cursor 760C is moved away from the window A mix point 762 and towards the window B mix point 764. Thus the image contained in premix window 712 is shown in the main output area 705. Indication 702 shows that the image editor is for Scene 1 Image Bank 2. This means the image shown in the main output area 705 of 700 of FIG. 7 is the image that represents Image Bank 2, which is the image parameter of the IPLD fixture 4 as shown in display screen 400 of FIG. 4.

Figure 8:
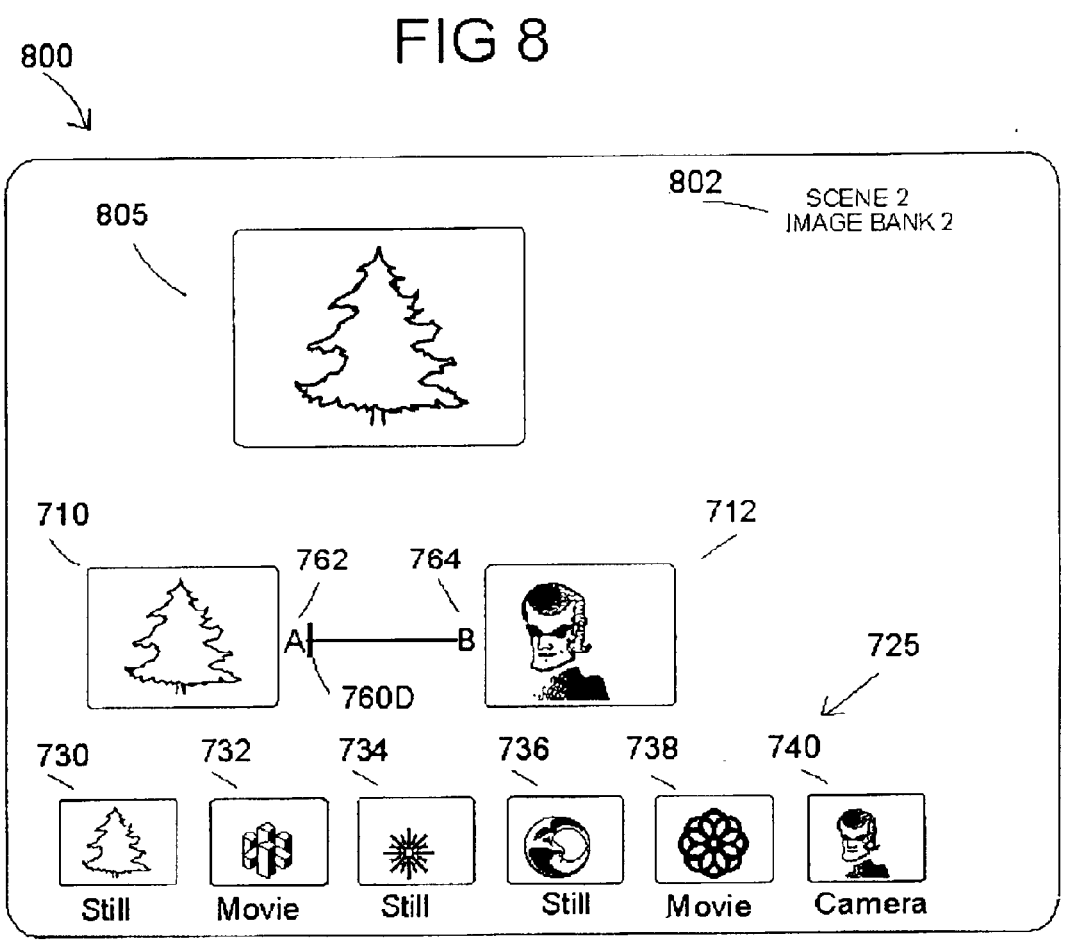
FIG. 8 is a pictorial drawing of a display on a display screen of the central controller of FIG. 3, the display showing image bank 2 for scene 2 and an assignment of another image output to that particular image bank, in accordance with the present invention.

A display screen 800 of FIG. 8 shows the same Image Bank 2 as shown in FIG. 7 except that the current scene is now Scene 2. In Scene 2 the slider cursor 760D has been moved away from the mix point 764 (B) of the premix window 712 and towards the mix point 762 (A) of the premix window 710. This results in the image contained in the premix window 710 being the main output image of main output area 805. So for Scene 2, Image Bank 2 contains the image of area 805. Indicator 802 shows that Scene 2 Image Bank 2 is displayed on the image editor.

The image from the Image Bank (the operator selects an image bank to vary the image parameter of an IPLD) can be further modified at the central controller, or preferably modified at the IPLD, or both. For example and as shown in display screen 400 of FIG. 4 under FIXTURE 3 TYPE IPLD 1 an image rotate parameter is shown. If an image from the image bank selected for the particular IPLD is commanded to rotate by the operator of the central controller, the rotation of the image can occur at the projecting IPLD. This means than many variations and special effects can occur from the original image bank image at the projecting IPLDs. Many IPLDs can project the same image as received from the image parameter Image Bank 2 but the resultant image as projected by the IPLDs can look different, as each one may have different special effects added.

Figure 9:
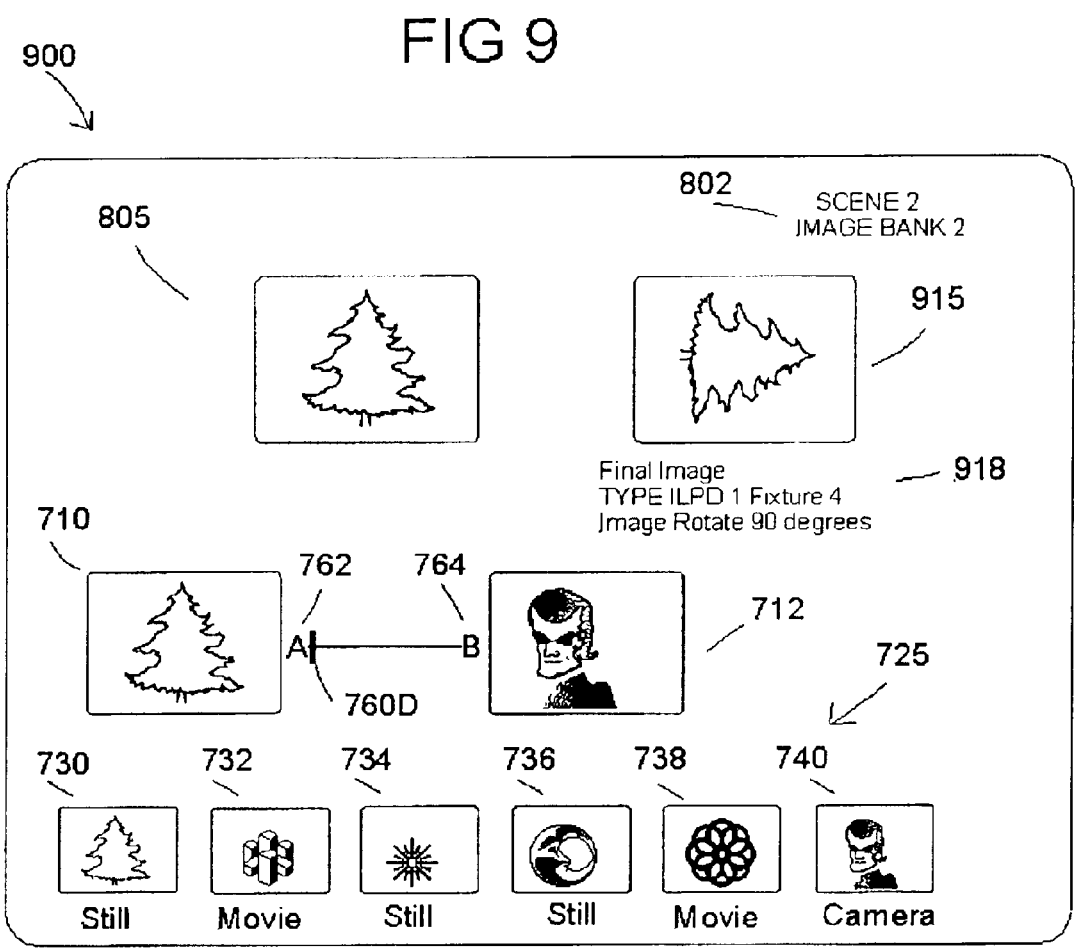
FIG. 9 is a pictorial drawing of a display on a display screen of the central controller of FIG. 3, the display including the display elements of FIG. 8 and further showing a final image window, in accordance with the present invention.

Since the image from an image bank can be further manipulated with special effects preformed locally at the projecting IPLD, many variances of the original image can be commanded by the operator of the central controller. It would however be an advantage to the operator of the central controller to be able to visualize the effects that have been added to the image from the image bank on a particular IPLD on the central controller. Preferably, this would involve an additional area in the image editor, or someplace on the central controller that displays the final image as projected by the IPLD with the addition of the additional effects that have been commanded by the central controller. The effect "Image Rotate" for example has been shown as one effect for the TYPE 1 IPLD as shown in the programming display screen 400 (FIG. 4) for FIXTURE 3 and for FIXTURE 4. The number of effects listed for control by the operator on the display screen 400 of FIG. 4 TYPE IPLD 1 has been simplified to just "Image Rotate" for ease of understanding. Many other effects can be preformed on the image assigned to the image parameter at the IPLD as commanded by the operator of the central controller. The effects can be preformed by processing at the central controller or at the IPLD. Some other examples of effects useful for manipulating an image are magnify, blur, colorize, distort, and pixelate, these effects being well known in the art of video mixers and special effect generators. Moreover, the manipulation of images stored in memory of an IPLD also is known in the art. The display screen 900 of FIG. 9 shows essentially the same components as display screen 800 of FIG. 8 with the addition of a final image area 915 and additional descriptive text 918. The final image area 915 allows the operator programming a selected IPLD on the central controller to visualize the image from the main output window 805 that is used by the IPLD with the additional effects that are added at the selected IPLD itself as commanded by the operator of the central controller. While the main output window 805 may be eliminated when the final image area 915 is displayed, its inclusion may facilitate editing by allowing the operator to see the editing results free of the additional effects.

Many suitable techniques may be used to end up with a final image shown at the central controller when adding effects to an image originating from the central controller. One way is to have the central controller mimic the effects added to the image that are being preformed at the IPLD and show the final image. In this technique, whatever effects are commanded by the operator of the central controller for the particular IPLD to be preformed on the main output image from the image bank are duplicated by the central controller, and the end result image displayed in the final image area. FIG. 9 shows the final image area 915 illustratively called by notation 918 on the display screen 900 "Final Image." This image is rotated 90 degrees from the main output area 805. The text 918 shows that the Image Rotate parameter is being used to rotate the main output image shown in the area 805 by 90 degrees.

Figure 10:
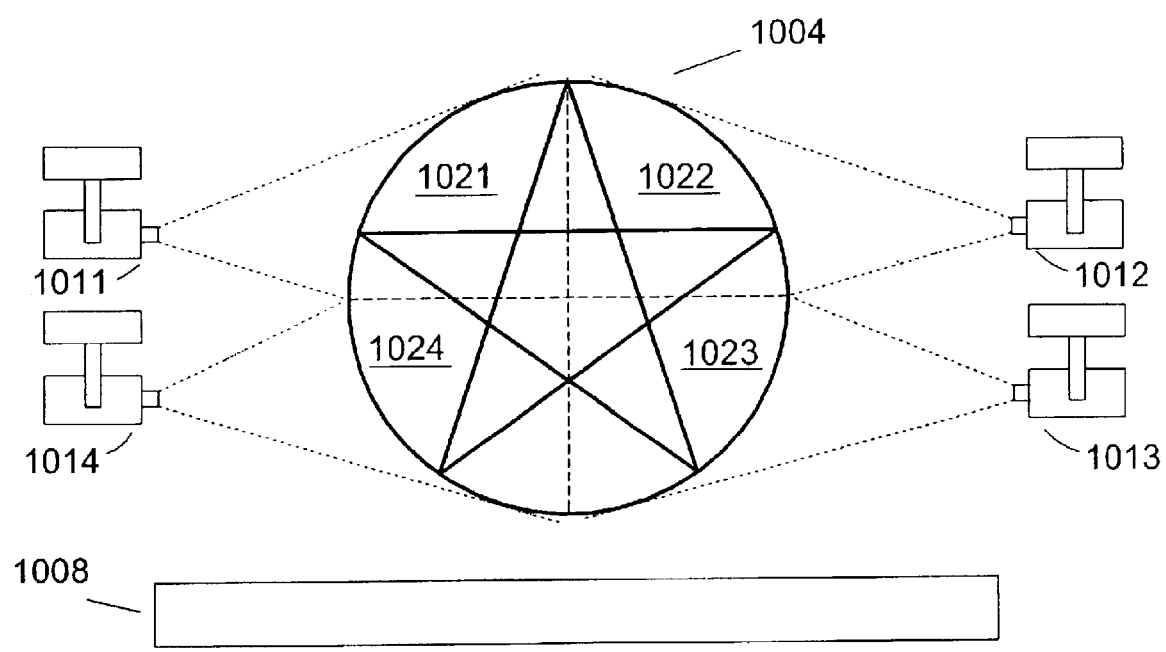
FIG. 10 is a part schematic, part pictorial drawing showing four IPLD type lighting devices projecting respective images at a stage, the projected composite image being a collage of sections that have been created from an originating image.

The central controller may also be used to form a collage, and provides a collage display screen to allow the operator to select an image to collage as well as determine which and how many sectional images and which IPLDs are to be involved in making the collage. FIG. 10 shows an image 1004 of a circled star as an example. The circled star image 1004 is divided into four parts, namely 1021, 1022, 1023 and 1024. The projected image section 1021 of the circled star is projected by IPLD 1011. The projected image section 1022 of the circled star is projected by IPLD 1012. The projected image section 1023 of the circled star is projected by IPLD 1013. The projected image section 1024 of the circled star is projected by IPLD 1014. The image 1004 is shown projected above a stage 1008, which illustratively may be a sound stage or theatre stage.

Figure 11:
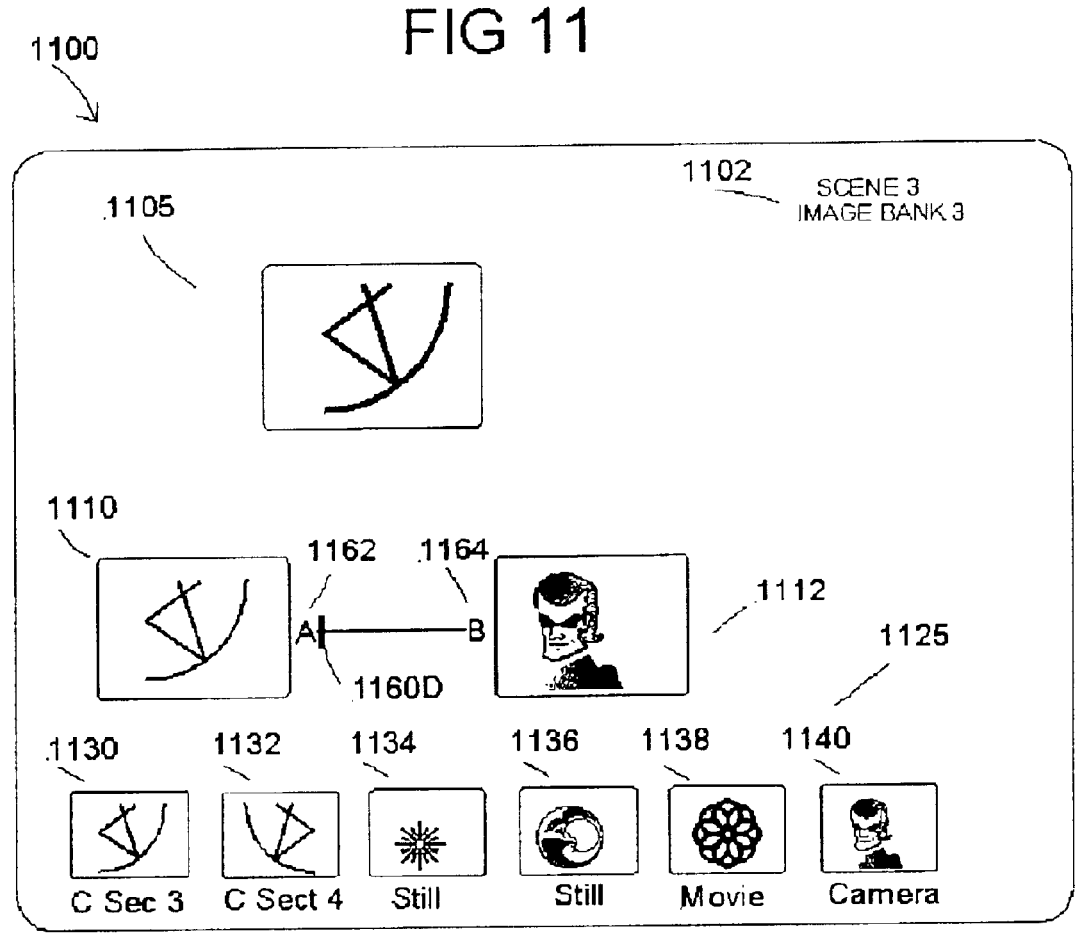
FIG. 11 is a pictorial drawing of a display on a display screen of the central controller of FIG. 3, the display showing image bank 3 for scene 3 and an assignment of an image output to that particular image bank, in accordance with the present invention.

FIG. 11 shows an example of the image bank that would be assigned to, say, IPLD 1013 of FIG. 10. The image editor display screen 1100 for Image Bank 3 is similar to the other image editor screens such as 500 of FIG. 5 and 900 of FIG. 9. The image editor main output area for Image Bank 3 is indicated by the reference numeral 1105. The informational text on the display screen 1100 indicates Scene 3 of Image Bank 3. Scene 3 in this case is the scene that creates the projected image of the circled star 1004 that is shown projected by the IPLD devices 1011, 1012, 1013, and 1014 in FIG. 10. The final output image shown in the main output area 1105 of FIG. 1 is the same image that is projected by IPLD 1013 of FIG. 10, which is the projected image section 1023.

The output image 1105 has been determined by the operator by first selecting the original image 1130 from the image library 1125 of FIG. 1. The image library 1125 contains a number of images, including collage sectional images 1130 and 1132. Collage sectional images 1130 and 1132 are labeled "C Sec 3" and "C Sec 4" respectively; "C Sec" designates "collage section." While the image library 1125 may also include the collage sectional images for the upper two quadrants (illustratively not shown in FIG. 11 because the operator has not scrolled far enough through the library to see them), these sectional images may be stored in another image library if desired. Next the operator places the image in the premix window 1110 by any suitable input device. Since the slider cursor 1160D is positioned towards the "A" premix window 1110 at point 1162, the final output area displays only the image 1130.

Also shown in FIG. 11 is the premix window 1112 and mix point 1164. The image shown in premix window 1112 also is obtained from the image 1140 in the image library 1125.

Figure 12:
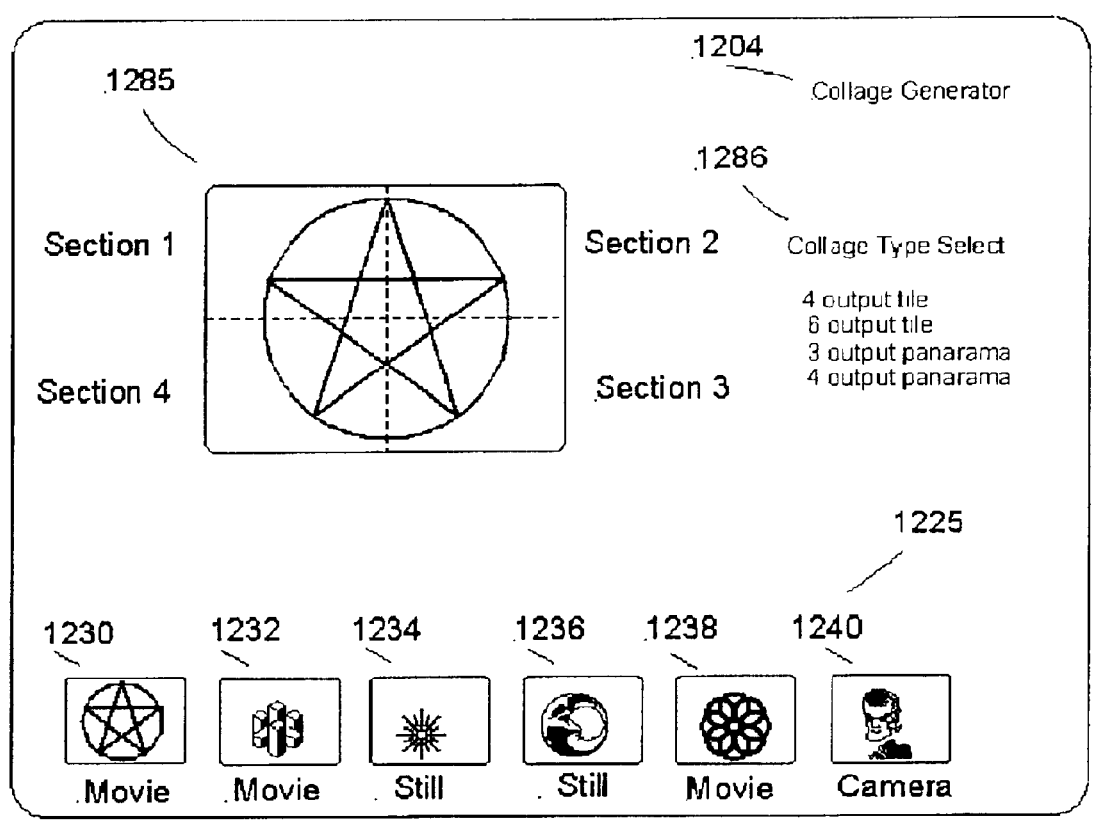
FIG. 12 is a pictorial drawing of a display on a display screen of the central controller of FIG. 3, the display showing a collage generator for generating a collage from an originating image, in accordance with the present invention.

Collage sectional images may be predefined or may be created by the operator on the central controller using a collage generator display. An illustrative collage generator display 1202 is shown in FIG. 12. The collage generator preferably can alter any image originating at the central controller to be created as a collage. Here we can see how to create the partial images of the circled star projected to form one image from IPLDs 1011, 1012, 1013 and 1014 (FIG. 10). First the operator selects by an input device, illustratively one of the controls 345 of the central controller 310 in FIG. 3, to display the collage generator screen 1202. The Collage Generator screen 1202 of FIG. 12 includes a collage output area 1285. The kind of collage desired by the operator preferably is selected from a list 1286 of various types, although it may be manually designated or selected from a collection of icons, or in any other desired manner. The collage generator can create many different types of collages, but for clarity only a few types are shown in the list 1286. In the case of FIG. 12, the "4 output tile" style of collage is selected. The operator selects which image to be collaged from the image library 1225 (which may be the same as image library 1125 or may be different) by dragging (or other type of input device) the image to be collaged to the collage output area 1285. In the case of FIG. 12, the circled star 1230 image is chosen to be placed in the collage output area 1285. Since the "4 output tile" style was selected from collage type select list 1286, the circled star is divided into four sections. Each section of the image in the collage output area 1285 is labeled as Section 1, Section 2, Section 3 and Section 4, and preferably the image library is automatically updated by the addition of these sectional images. Preferably, the section numbers in the collage output area 1285 of FIG. 12 are also used to identify the sectional collage images placed into the Image Library 1125 for Image Bank 3 shown in the image editor display screen 1100 of FIG. 11. For example, Section 3 of area 1285 of FIG. 12 is shown in the image library 1125 of FIG. 11 as 1130 and is labeled "C Sec 3," and Section 4 of area 1285 of FIG. 12 is shown in the Image Library 1125 of FIG. 11 as 1132 and is labeled "C Sec 4."

For ease of operation during programming or editing of the central controller, the operator may inquire about a collage sectional image located in an image library of an image bank by clicking on the collage sectional image itself (or by using any input device) to bring up the collage generator display that created that particular image. For example, if the operator clicks on the sectional image 1130 located in the image library 1125 of the image editor display screen 1100, the collage generator display 1202 is brought up for review.

The collage generator may be provided with a variety of additional functions. For example, suitable manipulation of an image to be placed into the collage output area of the collage generator display may include stretching the image or squeezing the image in different directions to obtain a best fit into the collage output area. Techniques for performing manipulations of images such as stretching and squeezing are well known in the computer graphic arts. Varying the proportions of an image by stretching and squeezing allows images to be placed into collage output windows that normally would have not fit because they originally did not have the correct aspect. Also the images may be cropped or trimmed as known in the art to fit a collage output area.

The description of the invention and its applications as set forth herein is illustrative and is not intended to limit the scope of the invention as set forth in the following claims. Variations and modifications of the embodiments disclosed herein are possible, and practical alternatives to and equivalents of the various elements of the embodiments are known to those of ordinary skill in the art. These and other variations and modifications of the embodiments disclosed herein may be made without departing from the scope and spirit of the invention.

What is claimed is:

1. A method of controlling a lighting system having at least a plurality of IPLDs, comprising:

displaying a first plurality of parameters of a first one of the IPLDs at a central controller, the first plurality of parameters including a first image parameter;

displaying a first plurality of images at the central controller; and establishing at the central controller at least one first image for the first image parameter from the first plurality of images.

2. The method of claim 1 further comprising:

displaying a second plurality of parameters of a second one of the IPLDs at a central controller, the second plurality of parameters including a second image parameter;

displaying a second plurality of images at the central controller; and establishing at the central controller at least one second image for the second image parameter from the second plurality of images.

3. The method of claim 2 wherein:

the first image establishing step comprises establishing at the central controller a plurality of images for the first image parameter from the first plurality of images; and the second image establishing step comprises establishing at the central controller a plurality of images for the second image parameter from the second plurality of images.

4. The method of claim 2 further comprising:

furnishing the first image established in the first image establishing step to the first IPLD from the central controller;

and furnishing the second image established in the second image establishing step to the second IPLD from the central controller.

5. The method of claim 2 further comprising:

furnishing the first image established in the first image establishing step to the first IPLD from a computer other than the central controller, under control of the central controller;

and furnishing the second image established in the second image establishing step to the second IPLD from a computer other than the central controller, under control of the central controller.

6. The method of claim 2 wherein:

the first image parameter is a number, word or symbol;

and the second image parameter is a number, word or symbol.

7. The method of claim 1 wherein the first image establishing step comprises:

displaying a first image editor at the central controller; and mixing at least two images from the first plurality of images with the first image editor at the central controller to establish the first image.

8. The method of claim 2 wherein the first image establishing step comprises:

displaying a first image editor at the central controller; and mixing at least two images from the first plurality of images with the first image editor at the central controller to establish the first image;

and wherein the second image establishing step comprises:

displaying a second image editor at the central controller; and mixing at least two images from the second plurality of images with the second image editor at the central controller to establish the second image.

9. A method of controlling a lighting system having at least a plurality of IPLDs, comprising:

displaying a first plurality of parameters of a first one of the IPLDs at a central controller, the first plurality of parameters including a first image parameter;

displaying a first plurality of images at the central controller in response to an operator selection of the first image parameter; and originating from the central controller at least one first image for the first image parameter from the first plurality of images.

10. The method of claim 9 wherein the originating step comprises:

selecting at least one of the first plurality of images at the central controller to obtain the first image; and transmitting the first image to the first IPLD.

11. The method of claim 9 wherein the originating step comprises:

selecting at least two of the first plurality of images at the central controller to obtain selected images;

manipulating the selected images to obtain the first image; and transmitting the first image to the first IPLD.

12. The method of claim 11 wherein the manipulating step comprises mixing the selected Images in accordance with operator input to obtain the first image.

13. The method of claim 9 further comprising effecting the operator selection of the first image parameter in response to a selection event for the first image parameter.

14. The method of claim 9 further comprising:

displaying an identifier for the first IPLDs at the central controller; and effecting the operator selection of the first image parameter in response to a selection event for the identifier.

15. The method of claim 9 further comprising:

displaying a second plurality of parameters of a second one of the IPLDs at a central controller, the second plurality of parameters including a second image parameter;

displaying a second plurality of images at the central controller in response to an operator selection of the second image parameter; and originating from the central controller at least one second image for the second image parameter from the second plurality of images.

16. The method of claim 15 wherein:

the step of displaying the first plurality of parameters of the first IPLD comprises displaying the first plurality of parameters on a first display screen of the central controller;

the step of displaying the second plurality of parameters of the second IPLD comprises displaying the second plurality of parameters on the first display screen of the central controller;

the step of displaying the first plurality of images comprises displaying the first plurality of images on a second display screen of the central controller; and the step of displaying the second plurality of images comprises displaying the second plurality of images on the second display screen of the central controller.

17. The method of claim 15 wherein:

the step of displaying the first plurality of parameters of the first IPLD comprises displaying the first plurality of parameters on a first display screen of the central controller;

the step of displaying the second plurality of parameters of the second IPLD comprises displaying the second plurality of parameters on the first display screen of the central controller;

the step of displaying the first plurality of images comprises displaying the first plurality of images on the first display screen of the central controller; and the step of displaying the second plurality of images comprises displaying the second plurality of images on the first display screen of the central controller.

18. A method of operating a lighting system that includes a central controller and a plurality of image projection lighting devices ("IPLDs"), comprising:

maintaining a plurality of parameters for each of the IPLDs at the central controller, the parameters for each of the IPLDs including at least one image parameter;

originating a first image from the central controller for a first one of the IPLDs, the first image being defined by the image parameter of the first IPLD; and originating a second image from the central controller for a second one of the IPLDs, the second image being defined by the image parameter of the second IPLD;

wherein the first image and the second image are different.

19. The method of claim 18 further comprising:

forming the first image from a plurality of images; and forming the second image from a plurality of images.

20. The method of claim 18 further comprising:

mixing a plurality of images to form the first image; and mixing a plurality of images to form the second image.

21. The method of claim 18 further comprising:

forming the first image from a plurality of images, including a live camera image; and forming the second image from a plurality of images, including a live camera image.

22. A method of operating a lighting system that includes a central controller and a plurality of image projection lighting devices ("IPLDs"), comprising:

originating a first image from the central controller for a first one of the IPLDs;

projecting the first image from the first IPLD;

originating a second image from the central controller for a second one of the IPLDs, the second image being different than the first image; and projecting the second image from the second IPLD;

wherein the first image and the second image are selected from a plurality of images stored at the central controller, the plurality of images having an identifying scheme for operator visualization of the images.

23. A method of controlling a lighting system comprising a plurality of multiparameter lights, including gobo-type multiparameter lights and IPLD-type multiparameter lights, controllable from a central controller, comprising:

storing at least one image library at the central controller;

displaying at the central controller an identifier and a plurality of parameters for each of the multiparameter lights, wherein the parameters for each of the IPLD-type multiparameter lights includes an image parameter;

displaying an image editor at the central controller in response to an operator selection of any of the IPLD-type multiparameter lights, the image editor including an image library area having a plurality of images, a mixer area, and an image area;

selecting at least two of the plurality of images from the image library in response to an operator action;

mixing the selected images in the mixer area to obtain an output image;

displaying the output image in the image area; and transmitting the output image from the central controller to the IPLD.

24. A method of operating a lighting system that includes a central controller and a plurality of image projection lighting devices ("IPLDs"), comprising:

originating a first image from the central controller for a first one of the IPLDs, the first image resulting from a crossfade between two different images;

projecting the first image from the first IPLD;

originating a second image from the central controller for a second one of the IPLDs, the second image being different than the first image and resulting from a crossfade between two different images; and projecting the second image from the second IPLD;

wherein the first image and the second image are respectively formed from a crossfade between at least two of a plurality of images stored at the central controller.

25. A central controller for controlling a lighting system comprising a plurality of image projection lighting devices ("IPLDs"), each having a plurality of parameters including an image parameter, the central controller comprising:

a display screen;

a memory containing a plurality of images;

a first programmable component for creating a first display on the display screen of at least some of the images;

a second programmable component for forming a first image from the first display, under operator control, for an image parameter of a first one of the IPLDs;

a third programmable component for creating a second display on the display screen of at least some of the images; and a fourth programmable component for forming a second image from the second display, under operator control, for an image parameter of a second one of the IPLDs;

wherein the first image and the second image are different.

26. The central controller of claim 25 further comprising:

a fifth programmable component for furnishing the first image to the first IPLD, and a sixth programmable component for furnishing the second image to the second IPLD.

27. The central controller of claim 25 wherein:

the second programmable component comprises a component for forming the first image from a combination of at least two of the images in the first display; and the fourth programmable component comprises a component for forming the second image from a combination of at least two of the images in the second display.

28. The central controller of claim 27 wherein:

the combination of the images in the first display is a crossfade combination; and the combination of the images in the second display is a crossfade combination.

29. A method of controlling a lighting system, the lighting system having a central controller and at least a plurality of IPLDs and each of the IPLDs having a plurality of parameters including an image parameter, the method comprising:

selecting a first one of the IPLDs at the central controller;

editing the image parameter of the first IPLD at the central controller to visualize a first image on a visual display device of the central controller;

establishing a first effect for the first image;

visualizing a first final image on the visual display device, the first final image comprising the first image with the first effect as being projected by the first IPLD;

selecting a second one of the IPLDs at the central controller;

editing the image parameter of the second IPLD at the central controller to visualize a second image on the visual display device;

establishing a second effect for the second image; and visualizing a second final image on the visual display device, the second final image comprising the second image with the second effect as being projected by the second IPLD.

30. The method of claim 29 further comprising:

applying the first effect to the first image at the central controller; and applying the second effect to the second image at the central controller.

31. The method of claim 29 further comprising:

applying the first effect to the first image at the first IPLD; and applying the second effect to the second image at the second IPLD.

32. The method of claim 29 wherein:

the first image and the first final image are visualized as separate images on the visual display device; and the second image and the second final image are visualized as separate images on the visual display device.

33. The method of claim 29 wherein:

the first image and the first final image are visualized as one image on the visual display device; and the second image and the second final image are visualized as one image on the visual display device.

34. A method of operating a lighting system that includes a central controller and a plurality of image projection lighting devices ("IPLDs"), comprising:

maintaining a plurality of parameters for each of the IPLDs at the central controller, the parameters for each of the IPLDs including at least one image parameter;

originating a first image from the central controller for a first one of the IPLDs, the first image being defined by the image parameter of the first IPLD; and originating a second image from the central controller for a second one of the IPLDs, the second image being defined by the image parameter of the second IPLD;

wherein the first image and the second image are first and second sections of a collage.

35. The method of claim 34 further comprising forming the first and second sections from a single image selected by the operator.

36. The method of claim 34 further comprising forming the first and second sections by selecting the first and second sections from a plurality of images stored at the central controller.

37. A method of operating a lighting system that includes a central controller, a plurality of first-type multiparameter lights having a plurality of parameters except for an image parameter, and a plurality of second-type multiparameter lights having a plurality of parameters including an image parameter, comprising:

varying the parameters for each of the first-type multiparameter lights at the central controller;

varying the parameters for each of the second-type multiparameter lights at the central controller, wherein for each of the second-type multiparameter lights, varying
the particular image parameter thereof comprises:
originating a first image from the central controller for
a first scene, the first image being defined by the
particular image parameter; and
originating a second image from the central controller
for a second scene, the second image being defined
by the particular image parameter.

38. The method of claim 37 wherein:
the first scene comprises a plurality of sections of a
collage;
the first image originated for a first one of the second-type
multiparameter lights in the first image originating step
is a first one of the sections of the collage;
and the first image originated for a second one of the
second-type multiparameter lights in the first image
originating step is a second one of the sections of the
collage.

39. The method of claim 38 further comprising creating
the sections of the collage from a style selected and applied
by an operator to a single image.

40. The method of claim 38 further comprising creating
the sections of the collage on a visual display device of the
central controller.

41. The method of claim 38 further comprising:
projecting the first section of the collage from the first
second-type multiparameter light; and
projecting the second section of the collage from the
second second-type multiparameter light.

42. The method of claim 37 wherein:
the first image for each of the second-type multiparameter
lights is unique; and
the second image for each of the second-type multiparameter
lights is unique.

43. The method of claim 37 wherein for each of the
second-type multiparameter lights, varying the particular
image parameter thereof is performed by the operator with
reference to a graphics visual display device of the central
controller.

44. A method of operating a lighting system that includes
a central controller and a plurality of image projection
lighting devices ("IPLDs"), comprising:
displaying a plurality of parameters for each of the IPLDs
at the central controller, the parameters including at
least one image parameter;
evoking a graphics tool at the central controller in
response to selection of one of the IPLDs by operator
action;
displaying a plurality of images for the graphics tool at the
central controller and;
originating an image from the central controller for the
image parameter of the selected IPLD, in response to
operator action with the graphics tool, from the plurality
of images.

45. The method of claim 44 further comprising acquiring
the images for the graphics tool from image storage local to
the central controller.

46. The method of claim 44 wherein:
the image parameter of the first IPLD is an image bank;
the step of evoking a graphics toot comprises displaying
an image editor for the image bank on a display screen
of the central controller; and
the step of displaying a plurality of images comprises
displaying an image library.

47. The method of claim 44 wherein:
the central controller comprises a first display screen and
a second display screen;
the IPLD parameter displaying step comprises displaying
the parameters for each of the IPLDs on the first display
screen;
the evoking step comprises displaying the graphics toot
on the second display screen;
and the images displaying step comprises displaying the
images for the graphics tool on the second display
screen.

48. The method of claim 44 wherein:
the central controller comprises only one display screen;
the IPLD parameter displaying step comprises displaying
the parameters for each of the IPLDs on the display
screen;
the evoking step comprises displaying the graphics tool
on the display screen;
and the images displaying step comprises displaying the
images for the graphics tool on the display screen.

49. The method of claim 44 wherein the lighting system
further includes at least one gobo-type multiparameter light,
further comprising:
providing for selection of at least one parameter of the
gobo-type multiparameter light at the central controller; and
varying the selected parameter.

50. A method of operating a lighting system that includes
a central controller and a plurality of image projection
lighting devices ("IPLDs"), comprising:
displaying a plurality of parameters for each of the IPLDs
at the central controller, the parameters including at
least one image parameter;
evoking a first graphics tool at the central controller in
response to selection of a first one of the IPLDs thereof
by operator action;
displaying a plurality of images for the first graphics tool
at the central controller;
originating an image from the central controller for the
image parameter of the first IPLD, in response to
operator action with the first graphics tool, from the
plurality of images;
evoking a second graphics tool at the central controller in
response to selection of a second one of the IPLDs by
operator action;
displaying a plurality of images for the second graphics
tool at the central controller;
and originating an image from the central controller for
the image parameter of the second IPLD, in response to
operator action with the second graphics tool, from the
plurality of images for the second graphics tool.

51. The method of claim 50 wherein:
the image parameter of the first IPLD is a first image
bank;
the step of evoking a first graphics tool comprises displaying
an image editor for the first image bank on a
display screen of the central controller;
the step of displaying a plurality of images for the first
graphics tool comprises displaying a first image library;
the image parameter of the second IPLD is a second
image bank;
the step of evoking a second graphics tool comprises
displaying an image editor for the second image bank
on a display screen of the central controller; and the step of displaying a plurality of images for the second graphics tool comprises displaying a second image library.

52. The method of claim 51 wherein the first image library and the second image library are one image library.

53. The method of claim 51 wherein the first image library and the second image library are different image libraries.

54. The method of claim 50 further comprising:
acquiring the images for the first graphics tool from image storage local to the central controller; and
acquiring the images for the second graphics tool from image storage local to the central controller.

55. The method of claim 50 further comprising:
acquiring the images for the first graphics tool from image storage remote from the central controller; and
acquiring the images for the second graphics tool from image storage remote from the central controller.

56. The method of claim 50 wherein:
the central controller comprises a first display screen and a second display screen;
the IPLD parameter displaying step comprises displaying the parameters for each of the IPLDs on the first display screen;
the first graphics tool evoking step comprises displaying the first graphics tool on the second display screen;
the step of displaying images for the first graphics tool comprises displaying images for the first graphics tool on the second display screen;
the second graphics tool evoking step comprises displaying the second graphics tool on the second display screen; and
the step of displaying images for the second graphics tool comprises displaying images for the second graphics tool on the second display screen.

57. The method of claim 50 wherein:
the central controller comprises only one display screen;
the IPLD parameter displaying step comprises displaying the parameters for each of the IPLDs on the display screen;
the first graphics tool evoking step comprises displaying the first graphics tool on the display screen;
the step of displaying images for the first graphics tool comprises displaying images for the first graphics tool on the display screen;
the second graphics tool evoking step comprises displaying the second graphics tool on the display screen;
and the step of displaying images for the second graphics tool comprises displaying images for the second graphics tool on the display screen.

58. The method of claim 50 wherein the lighting system further includes at least one gobo-type multiparameter light, further comprising:

providing for selection of at least one parameter of the gobo-type multiparameter light at the central controller; and varying the selected parameter.

59. The method of claim 50 wherein:
the step of displaying images for the first graphics tool comprises displaying at least a first sectional image of a collage;
the step of displaying images for the second graphics tool comprises displaying at least a second sectional image of the collage;
the step of originating an image for the image parameter of the first IPLD comprises furnishing the first sectional image to the first IPLD; and
the step of originating an image for the image parameter of the second IPLD comprises furnishing the second sectional image to the second IPLD.

60. A method of operating a lighting system that includes a central controller and a plurality of image projection lighting devices ("IPLDs"), comprising:
displaying a plurality of parameters for each of the IPLDs at the central controller, the parameters including at least one image parameter;
evoking a first graphics tool at the central controller in response to selection of a first one of the IPLDs by operator action;
displaying a plurality of images for the first graphics tool at the central controller;
originating a first sectional image of a collage from the central controller for the image parameter of the first IPLD, in response to operator action with the first graphics tool, from the plurality of images;
evoking a second graphics tool at the central controller in response to selection of a second one of the IPLDs by operator action;
displaying a plurality of images for the second graphics tool at the central controller, including a second sectional image of the collage; and
originating a second sectional image of the collage from the central controller for the image parameter of the second IPLD, in response to operator action with the second graphics tool, from the plurality of images for the second graphics tool.

61. The method of claim 60 further comprising applying a style to a single image at the central controller to form the first and second sectional images.

62. The method of claim 60 wherein the first and second sectional images are predefined.

* * * * *

UNITED STATES PATENT AND TRADEMARK OFFICE
CERTIFICATE OF CORRECTION

PATENT NO.     : 6,812,653 B2
DATED          : November 2, 2004
INVENTOR(S)    : Richard S. Belliveau It is certified that error appears in the above-identified patent and that said Letters Patent is hereby corrected as shown below:

Title page,
Item [12], replace "Bellivean" with -- Belliveau --.
Item [76], Inventor, replace "Richard S. Bellivean" with -- Richard S. Belliveau --.

Signed and Sealed this

Twenty-second Day of March, 2005

JON W. DUDAS
*Director of the United States Patent and Trademark Office*